3,527,735
PREPARATION OF POLYAMIDES FROM
p - PHENYLENE DIAMINE AND TAR-
TARIC ACID
Elizabeth G. Horvath and Bert Horvath, Bartlesville,
Okla., assignors to Phillips Petroleum Company, a corporation of Delaware
No Drawing. Filed Apr. 11, 1966, Ser. No. 541,478
Int. Cl. C08g 20/24
U.S. Cl. 260—78                2 Claims

ABSTRACT OF THE DISCLOSURE

Polyamides are formed from para-aromatic diamines and dicarboxylic acids such as tartaric acid using a polymerization temperature of at least 175° C. and a reduced pressure. These polyamides are useful in making adhesives, as cross-linking agents for other polymers, and the like.

---

This invention relates to a method for making polyamides.

Heretofore it was thought that the fusion of a tartrate of paraphenylenediamine would not yield a polymer, Chemical Abstracts, volume 60, column 2816–d.

Quite surprisingly, it has now been found that polyamides can be formed from para-aromatic diamines and dicarboxylic acids including tartaric acid if the polymerization temperature is at least 175° C. and the polymerization reaction is carried out under a reduced pressure.

Accordingly, it is an object of this invention to provide a new and improved method for making polyamides using para-aromatic diamines and dicarboxylic acids.

Other aspects, objects, and the several advantages of this invention will be apparent to those skilled in the art from the description and appended claims.

By this invention hydroxy-substituted polyamides comprising recurring

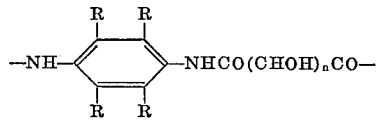

units are prepared by heating at an elevated temperature of at least 175° C., preferably 175 to 300° C., still more preferably 200 to 275° C., and under reduced pressure, preferably not greater than 5 millimeters of mercury, still more preferably not greater than 0.5 millimeter of mercury, a mixture, or preferably a salt, of an aromatic diamine having the formula

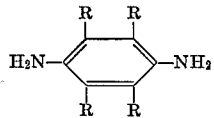

with a hydroxy-substituted dicarboxylic acid having the formula $HO_2C(CHOH)_nCO_2H$, wherein R is at least one member selected from the group consisting of hydrogen, methyl, and ethyl, and n is an integer from 1 to 4, inclusive.

Examples of hydroxy-substituted dicarboxylic acids which can be employed in the process of this invention include tartronic acid, tartaric acid, 2,3,4-trihydroxyglutaric acid, and 2,3,4,5-tetrahydroxyadipic acid.

Examples of some aromatic diamines which can be employed in the process of this invention include p-phenylenediamine, 2-methyl-p - phenylenediamine, 2 - ethyl-p-phenylenediamine, 2-methyl-5-ethyl-p-phenylenediamine, 2,3-dimethyl-p-phenylenediamine, 2,6-diethyl-p-phenylenediamine, 2,3,5-trimethyl-p-phenylenediamine, 2,5-dimethyl-3,6-diethyl - p-phenylenediamine, 2,3,5,6-tetramethyl-p-phenylenediamine, 2,3,5,6-tetraethyl-p-phenylenediamine, and the like.

The polyamides of this invention can be prepared by employing a salt formed by the reaction of the above-described diamine and dicarboxylic acid or can be prepared in situ by the direct use of the diamines and dicarboxylic acids in the polymerization process. When the salt is employed, it can be used in anhydrous form or as a hydrate. When preparing the salt in situ the mole ratio of diamine to dicarboxylic acid should be in the range of from about 0.5/1 to about 2/1, preferably about 1/1.

The salt itself can be formed by reacting one or more of the above diamines with one or more of the above dicarboxylic acids at a temperature in the range of from about 20 to about 150, preferably from about 50 to about 120° C. for a time varying widely but generally being in the range of from a few minutes, e.g. 3, to about 24 hours, preferably 10 minutes to 12 hours. The pressure employed in making the salt can vary widely but is generally that which is sufficient to maintain the reactants substantially in the liquid state. The salt can be made with or without the use of an extraneous diluent, but diluents are preferably used and include water, alcohols having from 1 to 10 carbon atoms per molecule, inclusive (e.g. methyl alcohol, ethyl alcohol, isopentyl alcohol, decyl alcohol, ethylene glycol, monomethyl ether of ethylene glycol, and the like); amides such as N,N-dimethylformamide, N,N-diethylacetamide, N-methyl - 2 - pyrrolidone, hexamethylphosphoramide, and the like; cyclic ethers such as dioxane, tetrahydrofuran, and the like; and nitriles such as acetonitrile, propionitrile, and the like. As much diluent can be employed as desired but generally the minimum practical amount will be used which is that amount sufficient to form a liquid solution of the reactants.

The polymerization temperature employed in making the polyamides according to this invention must be at least 175° C. and the polymerization pressure should be reduced as discussed above. The polymerization time can vary widely but will generally be in the range of from about 10 minutes to about 12 hours, usually being from about 1 hour to about 6 hours. The same diluents, if any are used, as described hereinabove with respect to the making of the salt can be employed in introducing the salt into the polymerization zone.

The polymers produced according to the method of this invention can be separated from the reaction mixture in any conventional manner including precipitating, filtering, and the like. The polymers of this invention are useful in making adhesives, as cross-linking agents for other polymers, and the like.

EXAMPLE

A mixture of 10.8 g. (0.1 mole) of p-phenylenediamine and 15 g. (0.1 mole) of tartaric acid in 75 ml. of freshly distilled N-methyl-2-pyrrolidone was heated in a nitrogen atmosphere to a maximum temperature of 108° C., after which the temperature was lowered to 90° C. The mixture was then maintained at 80 to 90° C. for approximately 18 hours. Benzene was added to the resulting reaction mixture, whereupon a deep blue solid precipitated. Filtration of the mixture gave 37 g. of crystalline solid melting at about 170° C. Recrystallization of the solid from water and from water-ethanol gave 20 g. of a brilliant purple solid melting at 160–163° C. with sintering. Elemental analysis of this solid indicated it to be the monohydrate of p-phenylenediamine tartrate

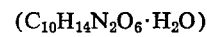

*Analysis.*—Calculated for $C_{10}H_{14}N_2O_6 \cdot H_2O$ (percent): C, 43.4; H, 5.8; N, 10.1. Found (percent): C, 43.6; H, 5.9; N, 10.2.

A sample of the above hydrated salt was dried at 100° C. for 24 hours under a pressure of about 1 mm. Hg. Elemental analysis showed the resulting product to be anhydrous p-phenylenediamine tartrate ($C_{10}H_{14}N_2O_6$).

*Analysis.*—Calculated for $C_{10}H_{14}N_2O_6$ (percent): C, 46.5; H, 5.5; N, 10.8. Found (percent): C, 46.6; H, 5.8; N, 11.9.

The above anhydrous salt was heated at 200–250° C. under a pressure of less than 0.1 mm. Hg for 1 hour, initially resulting in a fused mass which subsequently solidified during the heating process. The polymer-containing solid was pulverized and reheated at 250° C. for approximately 2 hours under a pressure of less than 0.1 mm. Hg to further polymerize same. The resulting dark polymer was thermally stable and did not melt at temperatures up to about 300° C. The polymer was somewhat soluble in N-methyl-2-pyrrolidone. Elemental analysis indicated the polymer was a polyamide having recurring

units (i.e., $C_{10}H_{10}N_2O_4$ units).

*Analysis.*—Calculated for $C_{10}H_{10}N_2O_4$ (percent): C, 54.1; H, 4.5; N, 12.6. Found (percent): C, 54.3; H, 4.4; N, 11.3.

Reasonable variations and modifications are possible within the scope of this disclosure without departing from the spirit and scope thereof.

We claim:
1. A method of making a solid polyamide consisting essentially of recurring

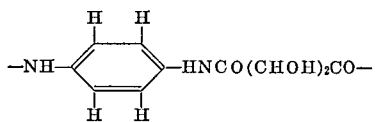

units comprising heating a combination of paraphenylenediamine and tartaric acid at a temperature of at least 175° C. and under a reduced pressure not greater than 5 millimeters of mercury, wherein the combination is formed into a salt having a diamine to acid mole ratio of about 1/1.

2. The method according to claim 1 wherein the temperature is in the range of from about 200 to about 275° C. and the pressure is not greater than 0.5 millimeter of mercury.

References Cited
UNITED STATES PATENTS

| | | | |
|---|---|---|---|
| 2,279,745 | 4/1942 | Stevenson | 260—78 |
| 2,389,628 | 11/1945 | Martin | 260—78 |
| 2,875,059 | 2/1959 | Unruh et al. | 260—78 |
| 2,938,885 | 5/1960 | Blanchette | 260—78 |

HAROLD D. ANDERSON, Primary Examiner

U.S. Cl. X.R.

260—30.2; 117—161